(12) United States Patent
Sasaki et al.

(10) Patent No.: US 12,157,500 B2
(45) Date of Patent: Dec. 3, 2024

(54) DRIVING ASSISTANCE DEVICE UTILIZING PEDESTRIAN-WEARABLE DEVICE DATA FOR CALCULATING PEDESTRIAN POSITION WITHIN A ROAD CROSSING

(71) Applicant: TOYOTA JIDOSHA KABUSHIKI KAISHA, Toyota (JP)

(72) Inventors: Kiyoto Sasaki, Susono (JP); Makoto Kawaharada, Susono (JP); Satoshi Nakamura, Susono (JP); Kenichi Okumura, Gotemba (JP); Naotoshi Kadotani, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 244 days.

(21) Appl. No.: 17/939,432

(22) Filed: Sep. 7, 2022

(65) Prior Publication Data

US 2023/0150545 A1 May 18, 2023

(30) Foreign Application Priority Data

Nov. 18, 2021 (JP) ................. 2021-187702

(51) Int. Cl.
*B60W 60/00* (2020.01)
*B60Q 1/50* (2006.01)
(Continued)

(52) U.S. Cl.
CPC ......... *B60W 60/0017* (2020.02); *B60Q 1/525* (2013.01); *B60W 50/0097* (2013.01);
(Continued)

(58) Field of Classification Search
None
See application file for complete search history.

(56) References Cited

U.S. PATENT DOCUMENTS

| 2015/0035685 A1* | 2/2015 | Strickland | B60Q 9/008 340/901 |
| 2021/0043013 A1 | 2/2021 | Tatara | |

(Continued)

FOREIGN PATENT DOCUMENTS

| JP | 2007-072658 A | 3/2007 |
| JP | 2011-253403 A | 12/2011 |

(Continued)

*Primary Examiner* — James J Lee
*Assistant Examiner* — Jonathan E Reinert
(74) *Attorney, Agent, or Firm* — Dinsmore & Shohl LLP (57) ABSTRACT

A vehicle control device includes a first prediction unit that predicts a reaching time for a vehicle to reach a cross point in front of the vehicle in a case where a pedestrian who crosses the cross point is detected based on information transmitted from a wearable device attached to the pedestrian, a second prediction unit that predicts a crossing time for the pedestrian to complete crossing the cross point based on information for specifying a walking speed acquired from the wearable device, an estimation unit that estimates whether or not the pedestrian is able to safely cross the cross point based on the predicted reaching time and the predicted crossing time, and an execution controller that executes a safe driving assistance control with respect to the vehicle in a case where the estimation unit estimates that the pedestrian is not able to safely cross the cross point.

6 Claims, 7 Drawing Sheets

(51) Int. Cl.
*B60W 50/00* (2006.01)
*B60W 50/14* (2020.01)
*G08G 1/16* (2006.01)

(52) U.S. Cl.
CPC ............ *B60W 50/14* (2013.01); *G08G 1/164* (2013.01); *G08G 1/166* (2013.01); *B60W 2050/146* (2013.01); *B60W 2554/4029* (2020.02); *B60W 2554/4041* (2020.02); *B60W 2554/4042* (2020.02); *B60W 2554/4045* (2020.02); *B60W 2556/50* (2020.02)

(56) References Cited

U.S. PATENT DOCUMENTS

| | | | |
|---|---|---|---|
| 2021/0347294 A1* | 11/2021 | Mochizuki | F21S 41/27 |
| 2022/0051558 A1* | 2/2022 | Choi | H04W 4/40 |

FOREIGN PATENT DOCUMENTS

| | | | |
|---|---|---|---|
| JP | 2012-063918 A | 3/2012 | |
| JP | 2017-054440 A | 3/2017 | |
| JP | 2017-533485 A | 11/2017 | |
| WO | 2012/035390 A1 | 3/2012 | |
| WO | 2016/020400 A2 | 2/2016 | |
| WO | 2019/156106 A1 | 8/2019 | |

\* cited by examiner

DRIVING ASSISTANCE DEVICE UTILIZING PEDESTRIAN-WEARABLE DEVICE DATA FOR CALCULATING PEDESTRIAN POSITION WITHIN A ROAD CROSSING

CROSS-REFERENCE TO RELATED APPLICATION

This application claims priority to Japanese Patent Application No. 2021-187702 filed on Nov. 18, 2021, incorporated herein by reference in its entirety.

BACKGROUND

1. Technical Field

The present disclosure relates to a technical field of a vehicle control device that controls execution of various safe driving assistance in a vehicle, such as deceleration, stop, or warning to a driver or a pedestrian.

2. Description of Related Art

As such kind of device, for example, the applicants of the present application proposes a device configured to receive, from a pedestrian crossing information output device provided at an intersection, crossing information including a traveling direction of a pedestrian and a crosswalk number generated based on information output from an IC tag attached to shoes of the pedestrian, and to issues warning of the traveling direction of the pedestrian to a driver in a case where the pedestrian is present on the crosswalk in a traveling direction of a host vehicle (see Japanese Unexamined Patent Application Publication No. 2007-072658 (JP 2007-072658 A)).

SUMMARY

However, according to the JP 2007-072658 A, even in a case where a pedestrian can safely cross a crosswalk, warning is issued to a driver without omission, so that the driver feels annoyed. Therefore, according to the research of the applicants of the present application, it is desirable to grasp with high accuracy whether or not the pedestrian can cross the crosswalk before safe driving assistance, such as warning, is executed, but there is an individual difference in a walking speed, so that there is a technical problem that prediction with high accuracy is difficult.

The present disclosure is to provide a vehicle control device that enables appropriate execution of the safe driving assistance in a case where the pedestrian crosses a road without the crosswalk or the crosswalk in front of the vehicle.

An aspect of the present disclosure relates to a vehicle control device that controls a vehicle configured to acquire various information including information for specifying a walking speed transmitted from a wearable device attached to a pedestrian. The vehicle control device includes a first prediction unit, a second prediction unit, an estimation unit, and an execution controller. The first prediction unit is configured to predict a reaching time for the vehicle to reach a cross point in front of the vehicle or a reaching point in time when the vehicle reaches the cross point in a case where the pedestrian who crosses the cross point is detected based on the information transmitted from the wearable device. The second prediction unit is configured to predict a crossing time for the pedestrian to complete crossing the cross point or a crossing point in time when the pedestrian completes crossing the cross point based on the information for specifying the walking speed acquired from the wearable device. The estimation unit is configured to estimate whether or not the pedestrian is able to safely cross the cross point based on the predicted reaching time or reaching point in time and the predicted crossing time or crossing point in time. The execution controller is configured to execute a safe driving assistance control of assisting safe driving with respect to the vehicle in a case where the estimation unit estimates that the pedestrian is not able to safely cross the cross point.

With the vehicle control device according to the aspect of the present disclosure, it is possible to grasp with high accuracy whether or not the pedestrian having an individual difference in the walking speed can safely cross the cross point before the vehicle executes an operation related to the safe driving assistance, such as warning, in accordance with the walking speed of the pedestrian. Therefore, the safe driving assistance is not unnecessarily executed, and the driver can avoid feeling annoyed. On the contrary, in particular, in a case where a vulnerable road user or the like cannot safely cross the cross point, the safe driving assistance is appropriately executed.

Such action and effect according to the present disclosure will be further clarified by embodiments of the disclosure described below.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

1. Overall Configuration for Realizing Vehicle Control Device

First, with reference to FIG. 1, an example of an overall configuration for realizing a vehicle control device 10 according to a first embodiment will be described.

Figure 1:
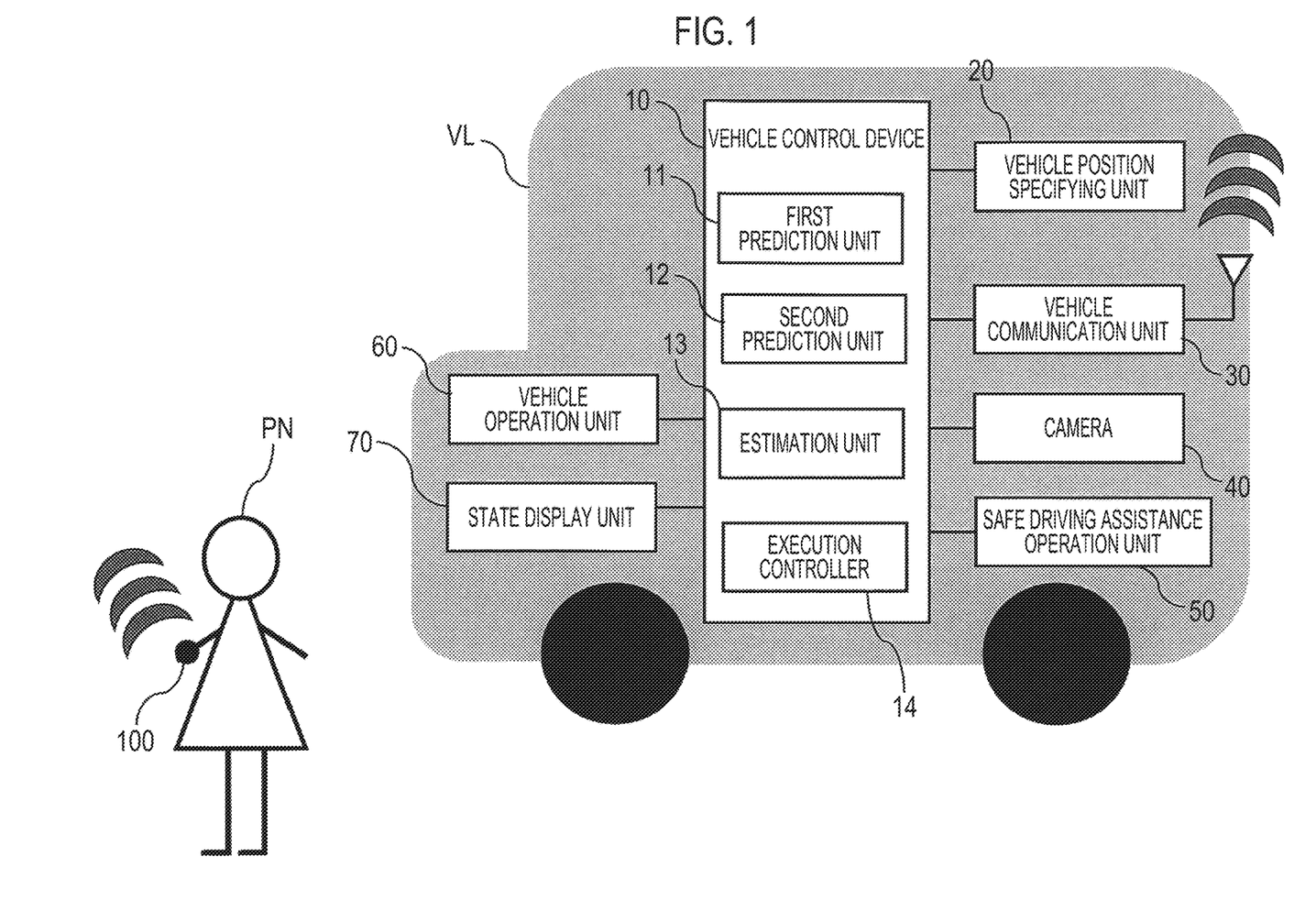
FIG. 1 is a schematic diagram showing an example of an overall configuration for realizing a vehicle control device according to a first embodiment.

As shown in FIG. 1, the vehicle control device 10 is mounted on a vehicle VL, and is configured to execute a safe driving assistance control in accordance with a walking ability of a pedestrian PN by communicating with a wearable device 100 attached to the pedestrian PN. In addition to the vehicle control device 10, for example, a vehicle position specifying unit 20, a vehicle communication unit 30, a camera 40, a safe driving assistance operation unit 50, a vehicle operation unit 60, and a state display unit 70 may be provided in the vehicle VL.

The vehicle position specifying unit 20 may include a sensor that receives radio waves transmitted from, for example, a satellite for global navigation satellite system (GNSS) (for example, a global positioning system (GPS) satellite), and detects a current position (latitude and longitude) of a host vehicle (that is, the vehicle VL). The vehicle position specifying unit 20 may specify the current position of the vehicle VL as a vehicle position (that is, positional information of the vehicle VL) based on the radio waves. The vehicle position specifying unit 20 may specify the vehicle position of the vehicle VL by adding, for example, information from various sensors (gyro sensor and the like) (not shown) to the information from the satellite for GNSS.

The vehicle communication unit 30 may be configured to communicate with each external configuration of the vehicle VL, such as the wearable device 100. The vehicle communication unit 30 may receive the radio waves transmitted from the wearable device 100 and directly communicate with the wearable device 100. The vehicle communication unit 30 may include an antenna having directivity in a traveling direction of the vehicle VL in order to communicate with the wearable device 100 in front of the vehicle VL. The vehicle communication unit 30 may have a configuration capable of also communicating with other configurations via a communication network, such as the Internet.

The camera 40 may be, for example, an in-vehicle camera provided to image at least a front landscape of the vehicle VL as a moving image. The safe driving assistance operation unit 50 may include, for example, various configurations that carry out an operation as the safe driving assistance. The safe driving assistance operation unit 50 may include, for example, a vehicle travel control system capable of decelerating and stopping the vehicle VL, a voice output unit that includes an in-vehicle speaker or the like capable of outputting a warning sound to a driver, an image output unit that includes a monitor, a windshield, or the like capable of displaying a camera image captured by the camera 40, and/or a lighting unit that includes various lamps, such as headlights, hazard lamps, or the like capable of executing a light distribution control in order to alert the pedestrian.

The vehicle operation unit 60 may receive operations by the driver or the like for, for example, air conditioning or setting of various functions. The vehicle operation unit 60 may include, for example, a button, a switch, and a touch panel. The state display unit 70 may display various states of the vehicle VL. The state of the vehicle VL may include, for example, a traveling speed, a traveling distance, a remaining amount of a battery (and/or a remaining amount of gasoline), and an open/closed situation of a door.

The vehicle control device 10 may be connected to each of the units 20 to 70 and may be configured to control the operation of each of the units 20 to 70. The vehicle control device 10 may be configured as a computer unit composed of, for example, a central processing unit (CPU), and a random access memory (RAM) and a read only memory (ROM) that are storage regions needed for its operation. For example, map data, a computer program, and the like may be held in the storage region of the vehicle control device 10. It should be noted that, in the map data, for example, positional information (latitude and longitude information) of a road, a traffic light, a crosswalk, and the like, road width information of each road, and the like may be set.

The vehicle control device 10 may read and execute the computer program stored in the ROM, for example. In addition, the vehicle control device 10 may read and execute the computer program from a device (not shown) disposed outside the vehicle VL via the communication network, such as the Internet. As a result, a logical functional block for controlling the operation of each of the units 20 to 70 of the vehicle VL may be realized in the vehicle control device 10. That is, the vehicle control device 10 can function as a controller that realizes the logical functional block for executing various operations executed by the vehicle VL. FIG. 1 shows an example of the logical functional block realized in the vehicle control device 10. As shown in FIG. 1, for example, a first prediction unit 11, a second prediction unit 12, an estimation unit 13, and an execution controller 14 may be realized in the vehicle control device 10.

2. Operation of Each Unit of Vehicle Control Device

The operation of each of the units 11 to 14 realized in the vehicle control device 10 will be described. The first prediction unit 11 may predict a reaching time for the vehicle VL to reach a cross point in front of the vehicle VL in a case where the pedestrian PN who crosses the cross point is detected based on the information transmitted from the wearable device 100. The first prediction unit 11 may directly receive the information transmitted from the wearable device 100 in order to detect the pedestrian PN. A detection method of the pedestrian who crosses the cross point and a calculation method of the reaching time will be described below.

The second prediction unit 12 may acquire the information for specifying the walking speed of the pedestrian PN from the wearable device 100 to predict a crossing time for the pedestrian PN to complete crossing the cross point. The estimation unit 13 may estimate whether or not the pedestrian PN can safely cross the cross point based on the predicted reaching time and the predicted crossing time. A specific method of the estimation and a calculation method of the crossing time will be described below.

The execution controller 14 may execute the safe driving assistance control of assisting the safe driving with respect to the vehicle VL in a case where the estimation unit 13 estimates that the pedestrian PN cannot safely cross the cross point. For example, the execution controller 14 may execute the safe driving assistance control with respect to the safe driving assistance operation unit 50 (including the vehicle travel control system, the voice output unit, the image output unit, the lighting unit, and the like, as described above). A specific control content of the safe driving assistance control will be described below.

3. Configuration of Wearable Device

Figure 2:
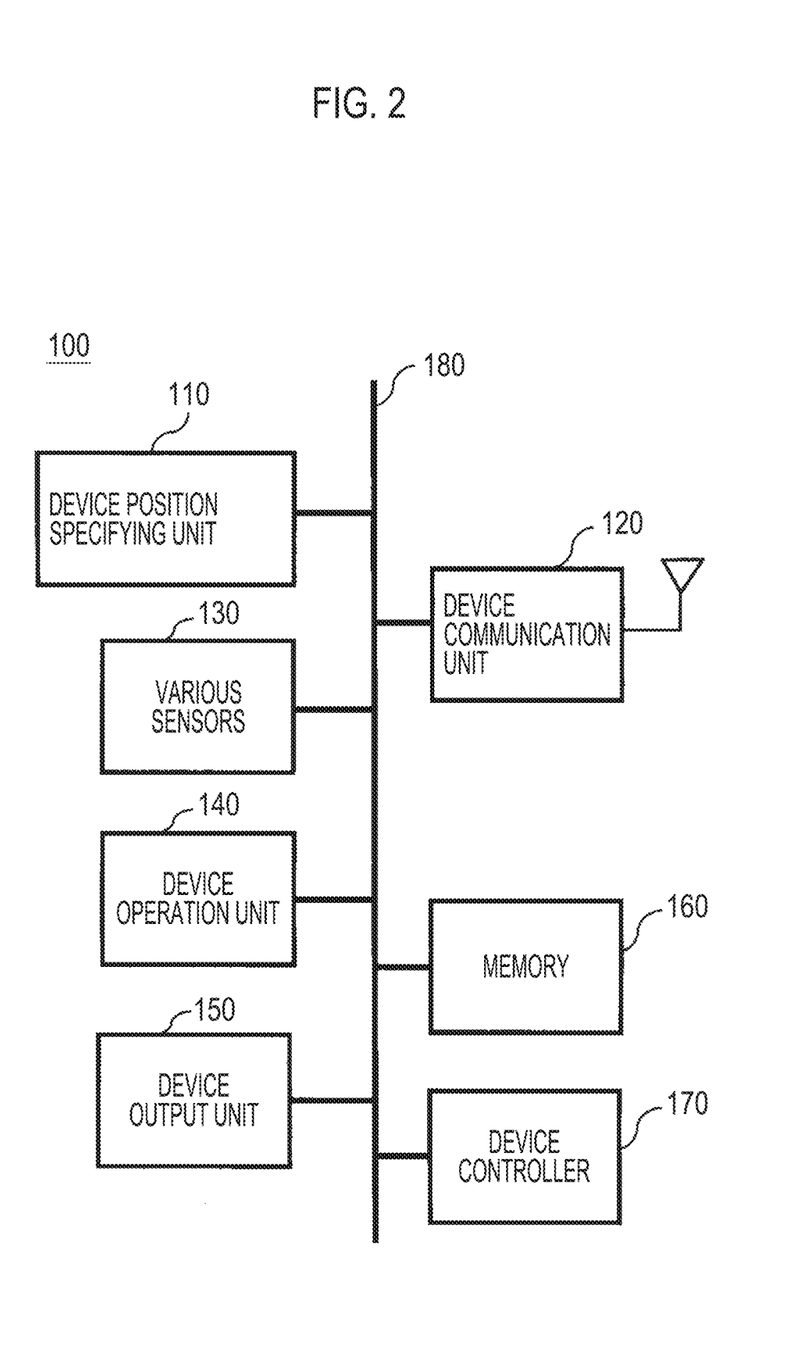
FIG. 2 is a block diagram showing an example of a hardware configuration of a wearable device according to the first embodiment.

An example of a hardware configuration of the wearable device 100 will be described with reference to FIG. 2. The wearable device 100 may be a device that can be attached to a part of a body of the pedestrian PN (for example, arms, fingers, legs, or a head). The wearable device 100 may include a device position specifying unit 110, a device communication unit 120, various sensors 130, a device operation unit 140, a device output unit 150, a memory 160, and a device controller 170. The units 110 to 170 of the wearable device 100 may be communicably connected to each other by, for example, a data bus 180. It should be noted that the wearable device 100 may further include a battery (not shown) that supplies electricity to each of the units 110 to 170.

Similar to the vehicle position specifying unit 20, the device position specifying unit 110 may include a sensor that receives the radio waves transmitted from the satellite for GNSS (for example, the GPS satellite) and detects a current position (latitude and longitude) of the wearable device 100, and may specify the current position of the wearable device 100 (that is, the pedestrian PN) based on the radio waves as a device position (that is, positional information of the wearable device 100). The vehicle position specifying unit 20 may specify the device position by adding, for example, information from the various sensors 130 (gyro sensor and the like) to the information from the satellite for GNSS. The device position may be regarded as, for example, the current position of the pedestrian PN to which the wearable device 100 is attached.

The device communication unit 120 may be configured to communicate with each external configuration (for example, the vehicle VL) of the wearable device 100. The device communication unit 120 may directly communicate with the vehicle communication unit 30 of the vehicle VL by a specific communication method. The device communication unit 120 may continuously transmit a device signal including the device position by the specific communication method, for example. As a result, the vehicle communication unit 30 can receive the device signal from the wearable device 100 present within a communication distance of the adopted communication method. The communication distance of the adopted communication method may be, for example, a distance sufficient for the safe driving assistance control to be executed until the vehicle VL reaches the cross point. The device signal may also include a device ID described below. In addition, the device communication unit 120 may be configured to communicate with a health management server described below via the communication network, such as the Internet.

The various sensors 130 may include, for example, an acceleration sensor, a gyro sensor, a geomagnetic sensor, and an operation sensor capable of detecting an operation related to a motion, such as walking or traveling of the pedestrian PN. As the operation sensor, for example, an inertial sensor capable of sensing various motion parameters, such as acceleration, angular velocity, geomagnetism, and temperature, with one device may be adopted. In addition, as the various sensors 130, in order to acquire real-time biological information of the pedestrian PN, for example, a biological information sensor including a heartbeat sensor, a blood pressure sensor, and the like may be provided.

The device operation unit 140 may receive the operation of the pedestrian PN in order to make various settings related to the functions of the wearable device 100. The device operation unit 140 may include, for example, a button, a switch, and a touch panel. The device output unit 150 outputs various information to be recognizable by the pedestrian PN. The device output unit 150 may include, for example, a speaker for voice output and a monitor for image output.

Figure 3:
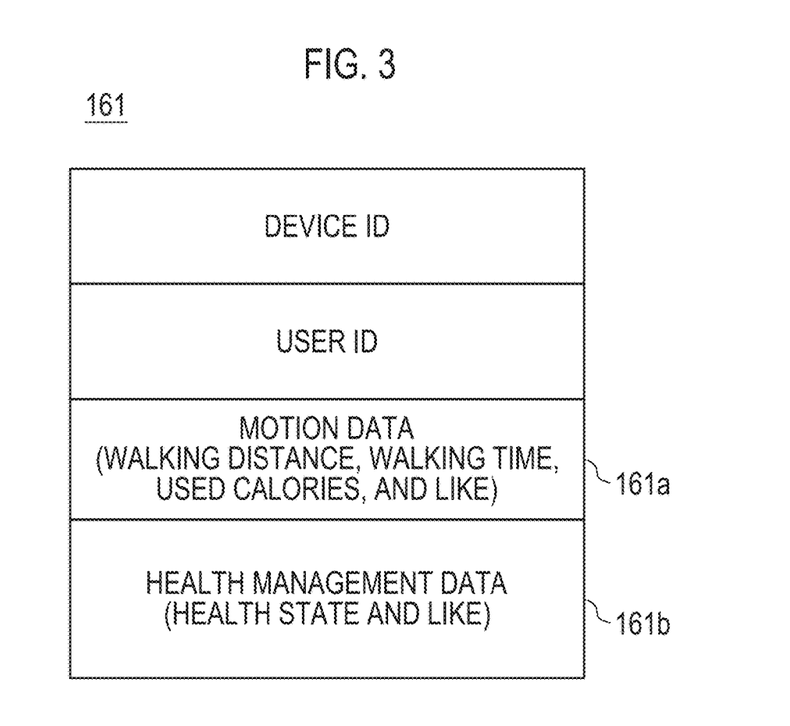
FIG. 3 is a diagram showing an example of data held by a wearable device according to the first embodiment.

The memory 160 may hold various data needed for a process by the device controller 170. FIG. 3 shows an example of device data 161 held in the memory 160. The device data 161 may include, for example, the device ID, a user ID, motion data 161a, and health management data 161b. The device ID is information for identifying each wearable device 100. The device ID may be set at the time of manufacturing the wearable device 100, for example. The user ID is information for identifying each pedestrian PN. The user ID may be set by a user (that is, the pedestrian PN) at the time of initial setting of the wearable device 100, for example. For example, in a case where one wearable device 100 is not used by a plurality of users, the user ID may not be set.

The motion data 161a may be data related to a daily motion of the pedestrian PN acquired based on the information detected by the operation sensor of the various sensors 130. The motion data 161a may include, for example, a walking distance, a walking time, a traveling distance, a traveling time, and used calories during a predetermined period (for example, 3 days). The motion data 161a may further include an average walking speed calculated from the walking distance and the walking time. For example, the walking distance, the walking time, and the average walking speed may function as the information for specifying the walking speed. The motion data 161a may be updated from moment to moment, for example, based on a detection value of the operation sensor of the wearable device 100. The motion data 161a may include, for example, the biological information, such as real-time blood pressure or pulse. The biological information may be updated at an appropriate timing, for example, by a detection value of the biological information sensor of the various sensors 130. The health management data 161b is data indicating, for example, a health state of the pedestrian PN (in particular, for example, a state affecting a motion ability function, such as a hearing disorder, a visual disorder, a motion disorder, or an intellectual disorder).

The device data 161 may be managed by, for example, the health management server (not shown) that is installed in the wearable device 100 and controls a health management application used in the wearable device 100 by the pedestrian PN. The health management server may be able to communicate with the wearable device 100 or the like via the communication network, such as the Internet. The health management server may also be able to communicate with, for example, a hospital management server (not shown) that manages hospital medical record information. For example, the motion data 161a accumulated in the memory 160 of the wearable device 100 may be transmitted to the health management server each time the predetermined period elapses by the device controller 170 described below. The transmitted motion data 161a may be managed, for example, as history data of the health management application. The health management data 161b may be set by, for example, input by the pedestrian PN himself/herself to the health management application or by the health management server based on the information from the hospital management server, and may be managed by the health management application. The health management data 161b may be acquired from the health management application as needed by the device controller 170 described below and stored (or downloaded) in the memory 160, for example. It should be noted that, in a case where the health management application has an offline specification, the device data 161 may be managed solely by the memory 160 of the wearable device 100.

Returning to FIG. 2, the device controller 170 may control the operation of each of the units 110 to 160 of the wearable device 100. The device controller 170 may be configured as, for example, a computer unit composed of a CPU, and a RAM and a ROM that are storage regions needed for its operation. The device controller 170 may be configured to control various processes executed on the wearable device 100 by executing a computer program. The device controller 170 may read and execute the computer program stored in the ROM, for example. The device controller 170 may read and execute the computer program from a device (not shown) disposed outside the wearable device 100 via the communication network, such as the Internet.

4. Safe Driving Assistance Process Executed by Vehicle Control Device

Figure 4:
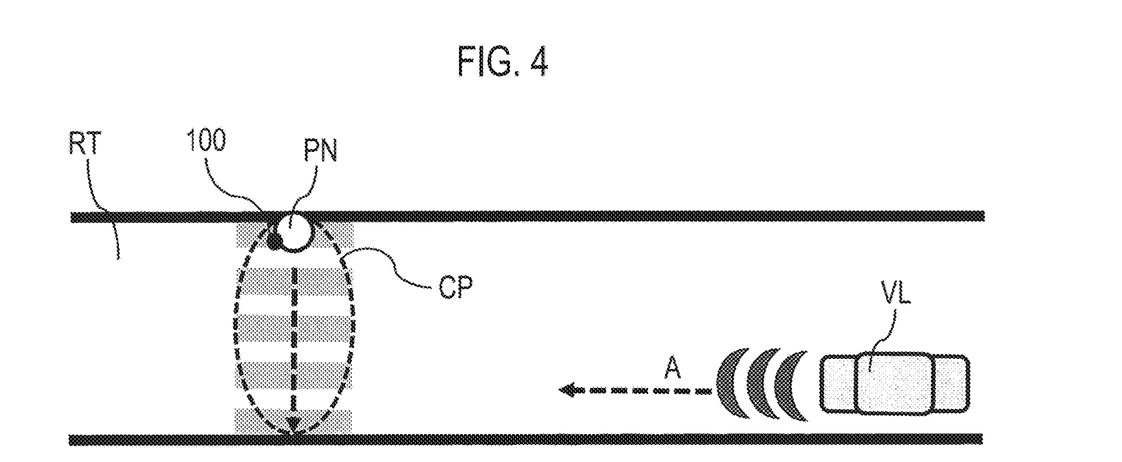
FIG. 4 is a schematic diagram showing an example of a relationship between a pedestrian and a vehicle at a cross point according to the first embodiment.

An example of a safe driving assistance process executed by the vehicle control device 10 according to the first embodiment will be described with reference to FIGS. 4 and 5. By executing the safe driving assistance process, as shown in FIG. 4, in a case where the pedestrian PN crosses a cross point CP in front of the vehicle VL on a road RT in which the vehicle VL travels in a traveling direction A, unnecessarily issuing the warning to the driver side can be avoided, and the safety of the pedestrian PN can be secured. The cross point CP may be a point at which the pedestrian PN crosses on the road RT. The cross point CP shown in FIG. 4 is shown as a point of the crosswalk provided on the road RT, but the cross point CP may not be limited to the point at which the crosswalk is provided.

Figure 5:
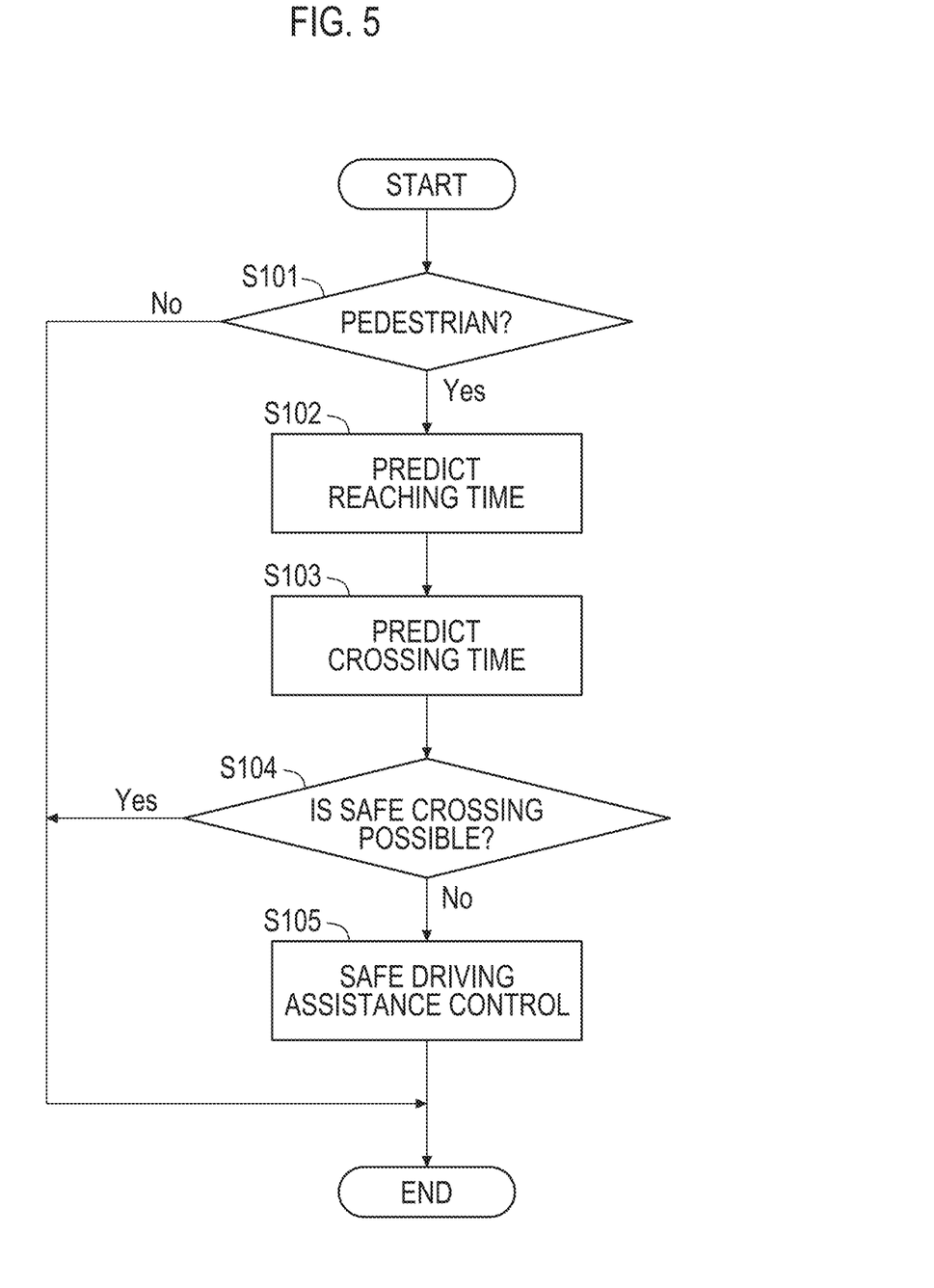
FIG. 5 is a flowchart showing an example of a process executed by the vehicle control device according to the first embodiment.

FIG. 5 is an example of a process routine showing an example of the safe driving assistance process. The vehicle control device 10 may receive, for example, the device signal transmitted from the wearable device 100 to start the process routine for each received device signal. In the safe driving assistance process, the vehicle control device 10 may identify the wearable device 100 of each pedestrian PN by, for example, the device ID included in the device signal. The vehicle control device 10 may appropriately refer to the map data in order to acquire the distance or the position in each process described below. In addition, the transmission and reception of the data or the signal associated with the process of the vehicle control device 10 may be executed via the vehicle communication unit 30, and the transmission and reception of data or the signal in the wearable device 100 may be executed via the device communication unit 120.

In a case where the process routine is started, the vehicle control device 10 may determine whether or not the pedestrian PN who crosses the cross point CP in front of the host vehicle (in the following, referred to as "crossing person PN") is detected, based on the received device signal (step S101). In a case where the crossing person PN is not detected (step S101: No), the vehicle control device 10 may terminate the current process routine. In a case where the crossing person PN is detected (step S101: Yes), the vehicle control device 10 may proceed to a reaching time prediction process (step S102).

Here, the detection of the crossing person PN will be described. The wearable device 100 attached to the pedestrian PN continuously transmits the device signal including the device position. That is, as the pedestrian PN moves, the device position indicated by the device signal also moves. In a case where the device signal transmitted from the wearable device 100 is received in the vehicle VL, the vehicle control device 10 may regard the device position as the position of the pedestrian PN. The vehicle control device 10 may acquire the vehicle position of the host vehicle from the vehicle position specifying unit 20. The vehicle control device 10 may confirm the movement of the position of the pedestrian PN in the map data held by the host vehicle, and may determine that the crossing person PN is detected in a case where the position of the pedestrian PN is in front of the host vehicle (that is, on the extension of the traveling direction A) and a determination is made that the movement of the position indicates that the pedestrian PN crosses the road RT. The vehicle control device 10 may specify a point on the road RT at which the crossing person PN crosses as the cross point CP.

In the reaching time prediction process of step S102, the first prediction unit 11 of the vehicle control device 10 may predict the reaching time for the host vehicle to reach the cross point CP. The first prediction unit 11 may predict the reaching time based on, for example, the traveling speed of the host vehicle and the distance from the vehicle position of the host vehicle to the cross point CP. The vehicle control device 10 may execute a crossing time prediction process following the reaching time prediction process (step S103). In the crossing time prediction process, the second prediction unit 12 of the vehicle control device 10 may predict the crossing time for the crossing person PN to complete the crosses the cross point CP. The second prediction unit 12 may predict the crossing time based on, for example, the walking speed of the crossing person PN and a crossing distance at the cross point CP. The second prediction unit 12 may specify the crossing distance of the cross point CP by referring to, for example, the map data. The second prediction unit 12 may specify the walking speed of the crossing person PN by, for example, acquiring information for specifying the walking speed in the motion data 161a of the crossing person PN from the wearable device 100 attached to the crossing person PN. In a case where the information for specifying the walking speed is, for example, the walking distance or the walking time, the second prediction unit 12 may calculate the walking speed from the acquired information to specify the calculated walking speed as the walking speed of the crossing person PN. Alternatively, in a case where the information for specifying the walking speed is, for example, the average walking speed, the second prediction unit 12 may specify, for example, the acquired average walking speed as the walking speed of the crossing person PN as it is.

The vehicle control device 10 may execute a safe crossing estimation process following the crossing time prediction process (step S104). In the safe crossing estimation process, the estimation unit 13 of the vehicle control device 10 may estimate whether or not the crossing person PN can safely cross the cross point CP based on the reaching time predicted in step S102 and the crossing time predicted in step S103. The estimation unit 13 may execute the estimation by, for example, comparing the predicted reaching time with the predicted crossing time. In order to secure the safety of the crossing person PN, the estimation unit 13 may estimate, for example, whether or not a time obtained by adding an appropriate margin to the predicted crossing time is longer than the predicted reaching time.

In step S104, in a case where the estimation unit 13 estimates that the crossing person PN can safely cross the cross point CP (step S104: Yes), the vehicle control device 10 may terminate the current process routine. On the other hand, in step S104, in a case where the estimation unit 13 estimates that the crossing person PN cannot safely cross the cross point CP (step S104: No), the vehicle control device 10 may proceed to a safe driving assistance control process (step S105). In the safe driving assistance control process, the execution controller 14 of the vehicle control device 10 may control the safe driving assistance operation unit 50 such that the safe driving assistance control is executed. As described above, the safe driving assistance operation unit 50 may include the vehicle travel control system, the voice output unit, the image output unit, and/or the lighting unit.

The execution controller 14 may control the vehicle travel control system such that, for example, deceleration or stop of the vehicle VL is forcibly executed as a part of the safe driving assistance control. In a case where a deceleration control is executed, the execution controller 14 may control the vehicle travel control system to reduce the speed by executing back-calculation from the crossing time of the pedestrian PN, for example. In a case where a stop control is executed, for example, the execution controller 14 may control the vehicle travel control system to stop the vehicle VL in front of the cross point CP by executing back-calculation from the crossing time of the pedestrian PN.

As a part of the safe driving assistance control, for example, the execution controller 14 may control the voice output unit such that the warning sound prompting the driver to decelerate or stop the vehicle VL is output from the in-vehicle speaker in order to secure the safety of the crossing person PN who crosses the front of the vehicle VL. In addition/alternatively, as a part of the safe driving assistance control, the execution controller 14 may display, on the monitor or the windshield, an image obtained by closing up (making relatively conspicuous) the image related to the crossing person PN in the camera image obtained by imaging the front landscape of the vehicle VL by the camera 40 in order to alert the driver to secure the safety of the crossing person PN who crosses the front of the vehicle VL, for example.

In addition/alternatively, as a part of the safe driving assistance control, the execution controller 14 may execute the light distribution control of the headlights, the hazard lamps, or the like of the vehicle VL in order to alert the crossing person PN to secure the safety of the crossing person PN who crosses the cross point CP, for example. As the light distribution control, for example, the brightness or an irradiation range of the beams of the headlights may be controlled. As the light distribution control, for example, the brightness, a blinking speed, or the like of the hazard lamps may be controlled. The vehicle control device 10 may terminate the current process routine after executing the safe driving assistance control as described above.

As a part of the safe driving assistance control, the execution controller 14 may further request the wearable device 100 to execute an alerting operation with respect to the crossing person PN. For example, the execution controller 14 may transmit an alerting operation request for requesting the alerting operation with respect to the crossing person PN to the wearable device 100 corresponding to the crossing person PN. The device controller 170 of the wearable device 100 may control the operation of the wearable device 100 in response to the received alerting operation request. The alerting operation may include, for example, vibration or light emission of the wearable device 100, and voice output of a message for alerting the crossing person PN. In particular, the alerting by the light emission of the wearable device 100 can also be alerting the driver of the vehicle VL.

In a case where the estimation unit 13 estimates whether or not the crossing person PN can safely cross the cross point CP, the estimation unit 13 may execute the estimation by acquiring the health management data 161b of the crossing person PN from the wearable device 100 and considering the health state indicated by the health management data 161b. For example, in a case where the health state indicates a state in which normal walking is difficult (the hearing disorder, the visual disorder, the motion disorder, or the intellectual disorder), the above margin added to the crossing time may be made larger than in other cases. It should be noted that the health management data 161b may be acquired by the device controller 170 of the wearable device 100 from the health management application (that is, the health management server) based on the device ID (or the user ID), for example, in response to the request of the estimation unit 13, and the acquired health management data 161b may be provided to the vehicle VL from the wearable device 100.

In a case where the biological information included in the motion data 161a indicates a dangerous abnormal value that causes a seizure, such as epilepsy or myocardial infarction, the estimation unit 13 may estimate that the crossing person PN cannot safely cross the cross point CP. Moreover, as the safe driving assistance control, the execution controller 14 may control the vehicle travel control system to cause the voice output unit to output, to the driver, a message indicating a possibility that the crossing person PN causes a seizure, and to stop the vehicle VL before the cross point CP, for example.

In a case where the execution controller 14 issues the warning or alerting to the crossing person PN, the execution controller 14 may issue the warning or the like by a notification method in accordance with the health state indicated by the health management data 161b of the crossing person PN. For example, in a case where the health management data 161b indicates the hearing disorder, a visual notification method (for example, the light distribution control of the vehicle VL and/or the light emission of the wearable device 100) may be adopted. In addition, for example, in a case where the health management data 161b indicates the visual disorder, an auditory notification method (for example, voice output of a danger message in the wearable device 100 and/or vibration of the wearable device 100) may be adopted. The execution controller 14 may acquire the health management data 161b from, for example, the health management application of the wearable device 100 as described above. Alternatively, the execution controller 14 may use the health management data 161b acquired by the estimation unit 13, for example.

The above process by the vehicle control device 10 can be applied regardless of the presence or absence of the traffic light at the cross point CP. It should be noted that, for example, in a case where a determination is made from the camera image of the front landscape obtained by the camera 40 that the traffic light is provided at the cross point CP, the execution controller 14 may change the control content of the safe driving assistance control in accordance with the color of the traffic light. For example, in a case where the traffic light is red (that is, in a situation in which a prediction is made that the vehicle VL is naturally stopped before the cross point CP), the execution controller 14 may control the voice output unit such that a message voice indicating that the crossing person PN is present in front of the vehicle VL is output from the in-vehicle speaker, instead of the warning sound. In addition, the execution controller 14 may not alert the crossing person PN.

Modification Example of Detection Method of Crossing Person

The vehicle control device 10 may monitor the camera image of the front landscape obtained by the camera 40 to detect the crossing person PN based on the camera image. The safe driving assistance process executed by the vehicle control device 10 in this case will be described according to the process routine of FIG. 5. First, in step S101, the vehicle control device 10 may monitor, for example, the movement of a pedestrian image in the camera image, and may determine that the crossing person PN is detected in a case where a determination is made that the pedestrian image shows that a situation in which the crossing person PN crosses the road RT on which the host vehicle travels. Monitoring the movement of the pedestrian image and the color of the traffic light may be associated with each other. In a case where a traffic light image of the traffic light (with respect to the vehicle VL) in the camera image shows red, a pedestrian traffic light is green, so that there is a high possibility that the crossing person PN who crosses the point at which the traffic light is provided is present. Therefore, in particular, in a case where the traffic light image in the camera image shows read, the vehicle control device 10 may monitor the movement of the pedestrian image in the vicinity of the traffic light image to determine whether or not the crossing person PN is detected.

The vehicle control device 10 may specify a position of the crossing person PN and a position of the cross point CP in the map data based on a position of the pedestrian image corresponding to the crossing person PN in the camera image. Therefore, in the reaching time prediction process in step S102, the first prediction unit 11 may predict the reaching time based on, for example, the distance to the cross point CP obtained based on the camera image and the current traveling speed. In addition, in the crossing time prediction process in step S103, the second prediction unit 12 may acquire, for example, a road width (that is, the crossing distance) of the cross point CP obtained based on the camera image from the map data. The second prediction unit 12 may acquire the walking speed of the crossing person PN based on the motion data 161a from the wearable device 100 in the same manner as described above. The second prediction unit 12 may predict the crossing time based on the acquired walking speed and crossing distance. The wearable device 100 of the crossing person PN may be identified by the device ID, for example. For example, the second prediction unit 12 may transmit a motion data request from the vehicle communication unit 30 toward the front of the vehicle VL, and the wearable device 100 that receives the motion data request responds to the motion data request to transmit the motion data to the vehicle communication unit 30 together with the device ID of the wearable device 100. The processes in step S104 and step S105 may be the same as the processes in step S104 and step S105 described above.

As described above, in a case where the detection of the crossing person PN and the prediction of the reaching time and the crossing time are executed based on the camera image, the wearable device 100 may not continuously transmit the device signal including the device position. In addition, in this case, the wearable device 100 may not include the device position specifying unit 110.

Second Embodiment

A second embodiment according to the present disclosure that is different from the first embodiment will be mainly described with reference to FIGS. 1 to 3, and FIGS. 6 to 8.

Figure 6:
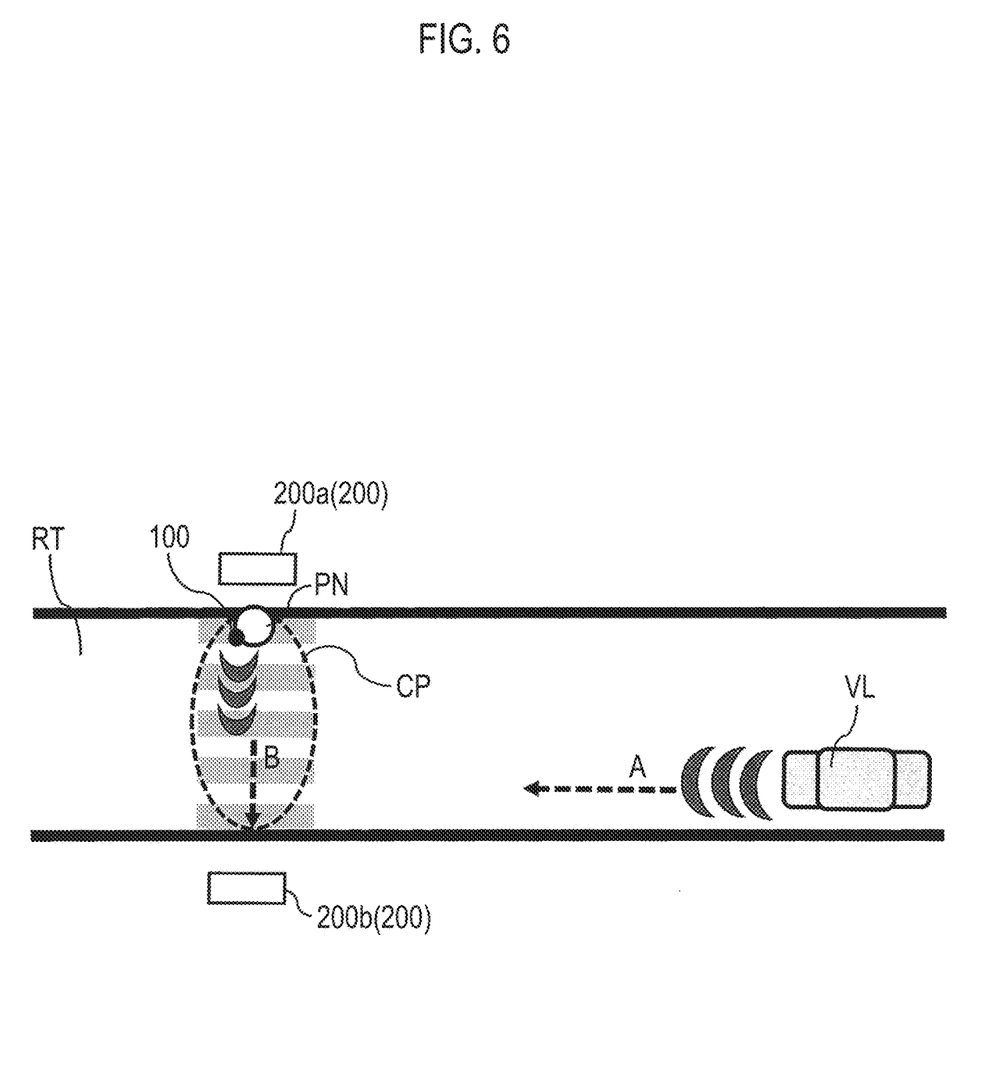
FIG. 6 is a schematic diagram showing an example of a relationship between the pedestrian at the cross point, a relay communication device, and the vehicle according to a second embodiment.

In the second embodiment, the communication between the wearable device 100 and the vehicle VL may be executed via a relay communication device 200 instead of direct communication. As shown in FIG. 6, the relay communication device 200 may be provided, for example, in the vicinity of the cross point CP, and may be configured to receive the device signal transmitted from the wearable device 100 at the cross point CP. FIG. 6 shows a state in which two relay communication devices 200a, 200b are provided on both sides of the road RT, respectively. In the following, in a case where the distinction is not needed, the relay communication devices 200a, 200b are referred to as "relay communication device 200". It should be noted that the cross point CP in which the relay communication device 200 is provided may be, for example, a point at which many pedestrians PN cross, and a point at which an accident occurs due to the crossing of the pedestrian PN regardless of the presence or absence of the crosswalk.

Figure 7:
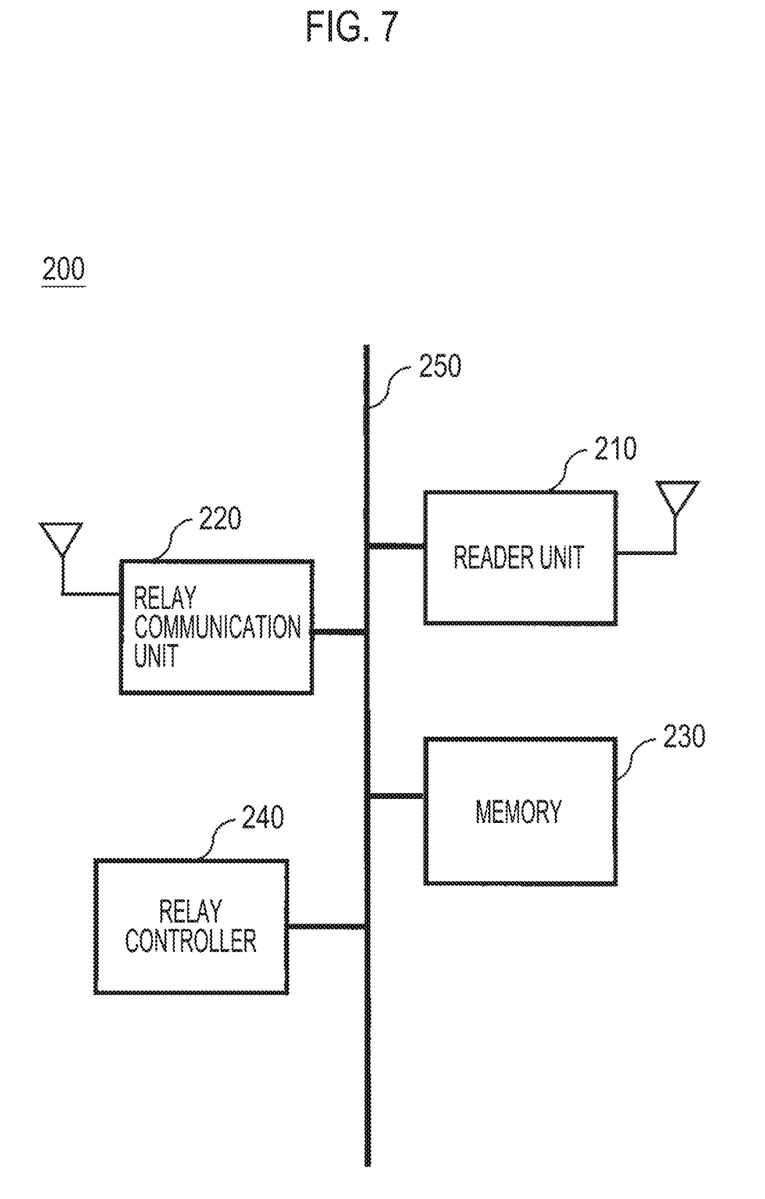
FIG. 7 is a block diagram showing an example of a hardware configuration of the relay communication device according to the second embodiment.

The relay communication device 200 may include a reader unit 210, a relay communication unit 220, a memory 230, and a relay controller 240, for example, as shown in FIG. 7. The reader unit 210, the relay communication unit 220, the memory 230, and the relay controller 240 may be communicably connected to each other via, for example, a data bus 250.

The reader unit 210 may be configured to read the data of the device data 161 by communicating with the wearable device 100, for example. The reader unit 210 may include an antenna having directivity in a reception range such that the radio waves transmitted from the cross point CP can be received, for example. As a result, the reader unit 210 can receive the device signal transmitted from the wearable device 100 (that is, the device communication unit 120) of the pedestrian PN who crosses the cross point CP. The relay communication unit 220 is a communication unit that enables communication connection with the vehicle VL, for example. A communication distance of a communication method applied to the reader unit 210 (for example, about 2 m) may be shorter than a communication distance of a communication method applied to the relay communication unit 220 (for example, about 200 m). Therefore, a short-range wireless communication technology that is inexpensive and consumes less power can be adopted for the communication between the reader unit 210 and the device communication unit 120 of the wearable device 100.

The memory 230 may store the data to be held by the relay communication device 200. In the memory 230, for example, a relay ID that is information for identifying each relay communication device 200 may be stored. The relay controller 240 may control an operation of each of the units 210 to 230 of the relay communication device 200. The relay controller 240 may be configured as, for example, a computer unit composed of a CPU, and a RAM, a ROM, and the like that are storage regions needed for its operation.

Returning to FIG. 6, the device communication unit 120 (see FIG. 2) of the wearable device 100 and the vehicle communication unit 30 (see FIG. 1) of the vehicle VL according to the second embodiment will be described. In the second embodiment, a position at which the relay communication device 200 is provided may be regarded as the cross point CP. Therefore, the device signal transmitted from the wearable device 100 may include, for example, the device ID and may not include the device position. The wearable device 100 may not include the device position specifying unit 110 (see FIG. 2). The device communication unit 120 of the wearable device 100 may include, for example, an antenna having directivity in a traveling direction B such that the communication with the reader unit 210 of the relay communication device 200b present on the extension of the traveling direction B of the crossing person PN who crosses the cross point CP is possible. Therefore, the device signal may be transmitted from the antenna toward the traveling direction B and may be received by the relay communication device 200b provided on the extension of the traveling direction B. The vehicle communication unit 30 of the vehicle VL may include, for example, an antenna having directivity in a traveling direction A such that the communication with the relay communication unit 220 of the relay communication device 200b present in front of the vehicle VL (that is, on the extension of the traveling direction A) is possible.

Figure 8:
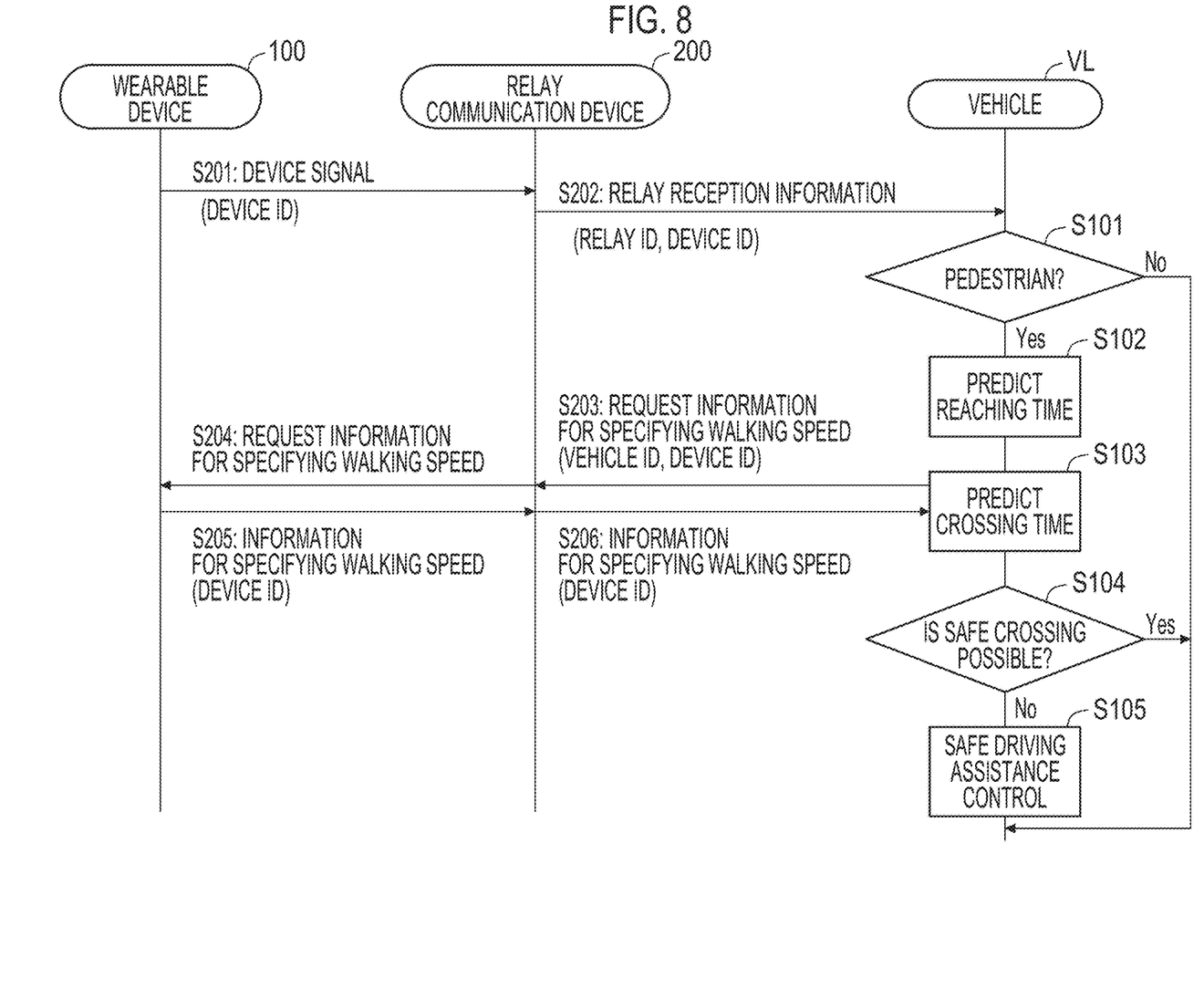
FIG. 8 is a sequence diagram showing an example of communication executed between the wearable device, the relay communication device, and the vehicle according to the second embodiment.

An example of a process executed in each of the wearable device 100, the relay communication device 200, and the vehicle VL in order to execute the process routine of FIG. 5 in the vehicle VL will be described with reference to FIG. 8. In the following description, the operation of the wearable device 100 may be controlled by the device controller 170, the operation of the relay communication device 200 may be controlled by the relay controller 240, and the operation of the vehicle VL may be controlled by the vehicle control device 10. The processes of steps S101 to S105 that are the processes of the vehicle VL in FIG. 8 correspond to steps S101 to S105 that are the processes of the vehicle control device 10 in FIG. 6, respectively. The device signal may be continuously transmitted from the device communication unit 120 of the wearable device 100. The vehicle VL may be in a state of waiting for reception of relay reception information described below. The map data held by the vehicle VL may have positional information of the relay communication device 200 corresponding to each relay ID.

The device signal including the device ID may be continuously transmitted from the wearable device 100 in the traveling direction B of the pedestrian PN, for example (step S201). As described above, the relay communication device 200 can receive the device signal transmitted from the wearable device 100 attached to the pedestrian PN who crosses the cross point CP. In a case where the device signal is received, the relay communication device 200 may transmit the relay reception information including the device ID included in the device signal and the relay ID of the relay communication device 200 from the relay communication unit 220 (step S202). Each vehicle VL that travels within a wireless communication distance of the relay communication unit 220 may receive the relay reception information. The vehicle VL may execute a process related to the detection of the crossing person PN based on the received relay reception information (step S101). For example, the vehicle VL may first confirm the position of the relay communication device 200 as a transmission source in the map data from the relay ID included in the relay reception information. The vehicle VL may regard the confirmed position of the relay communication device 200 as the position of the cross point CP. Moreover, in a case where the cross point CP is present in front of the host vehicle (that is, on the extension of the traveling direction A), the vehicle VL may determine that the pedestrian PN (that is, the crossing person PN) who crosses the cross point CP in front of the host vehicle is detected.

In a case where the crossing person PN is detected, the vehicle VL may execute the reaching time prediction process (step S102). In the reaching time prediction process, the vehicle VL (that is, the first prediction unit 11) may predict the reaching time by regarding the position of the relay communication device 200 as the position of the cross point CP. Subsequently, the vehicle VL may execute the crossing time prediction process (step S103). In the crossing time prediction process, the vehicle VL (that is, the second prediction unit 12), for example, may request the information for specifying the walking speed of the crossing person PN from the relay communication device 200 corresponding to the detected crossing person PN (step S203). Together with the request, for example, a vehicle ID of the vehicle VL and the device ID of the wearable device 100 as a request destination may be transmitted. The relay communication device 200 may transmit the request to the wearable device 100 as the request destination (step S204).

In response to the request, the wearable device 100 may transmit, for example, the information for specifying the walking speed from the reader unit 210 together with the device ID of the wearable device 100 (step S205). The "information for specifying the walking speed" is as described in the first embodiment. The relay communication device 200 that acquires the information for specifying the walking speed may, for example, transmit the information together with the device ID to the vehicle VL as the request source (step S206). A method of acquiring the walking speed of the crossing person PN based on the information for specifying the walking speed in the second embodiment may be the same as the method in the first embodiment. In addition, processes in step S104 and step S105 may be the same as processes in step S104 and step S105 in the first embodiment, respectively. Then, a series of processes in a case where communication between the wearable device 100 and the vehicle VL is executed via the relay communication device 200 is terminated.

The reaching time and the crossing time calculated in the first and second embodiments described above may be calculated as a reaching point in time and a crossing point in time based on the current time, respectively. In addition, in the first and second embodiments, the processes related to the reaching time and the crossing time may be appropriately changed and executed as the processes related to the reaching point in time and the crossing point in time.

As described in detail above, according to the present embodiment, in a case where the pedestrian can safely cross the cross point even when the pedestrian is the vulnerable road user or the like, the safe driving assistance is not unnecessarily executed, and the driver can avoid feeling annoyed. On the contrary, in a case where the vulnerable road user or the like cannot safely cross the cross point, the safe driving assistance is appropriately executed, and the safety or relief related to the crossing the road is secured for the vulnerable road user.

SUPPLEMENTARY NOTES

The following supplementary notes will be further disclosed with respect to the embodiments described above.

Supplementary Note 1

A supplementary note 1 of the present disclosure relates to a vehicle control device that controls a vehicle configured to acquire various information including information for specifying a walking speed transmitted from a wearable device attached to a pedestrian, the vehicle control device including a first prediction unit configured to predict a reaching time for the vehicle to reach a cross point in front of the vehicle or a reaching point in time when the vehicle reaches the cross point in a case where the pedestrian who crosses the cross point is detected based on the information transmitted from the wearable device, a second prediction unit configured to predict a crossing time for the pedestrian to complete crossing the cross point or a crossing point in time when the pedestrian completes crossing the cross point based on the information for specifying the walking speed acquired from the wearable device, an estimation unit configured to estimate whether or not the pedestrian is able to safely cross the cross point based on the predicted reaching time or reaching point in time and the predicted crossing time or crossing point in time, and an execution controller configured to execute a safe driving assistance control of assisting safe driving with respect to the vehicle in a case where the estimation unit estimates that the pedestrian is not able to safely cross the cross point.

With the vehicle control device according to the supplementary note 1, it is possible to grasp with high accuracy whether or not the pedestrian who tries to cross the road without the crosswalk or the crosswalk in front of the vehicle and has an individual difference in the walking speed can safely cross the cross point in accordance with the information for specifying the daily walking speed of the pedestrian before the vehicle actually executes the operation related to the safe driving assistance with respect to the driver, such as the warning, the deceleration, or the stop.

In this case, as the detection of the pedestrian who crosses the cross point in front of the vehicle (that is, one point or one place of the road without the crosswalk, or certain point or place of the crosswalk), the detection may be executed by acquiring information indicating that the pedestrian crosses the cross point from the wearable device side, or the detection may be executed by the vehicle control device side by acquiring a current movement situation of the pedestrian. The estimation of whether the pedestrian can safely cross the cross point may be executed based on a relationship between the reaching time and the crossing time (or a relationship between the reaching point in time and the crossing point in time). It should be noted that, in a case where there is the traffic light on the crosswalk at which the pedestrian tries to cross, the driver or the vehicle need only follow the traffic light, and it is also possible not to execute the safe driving assistance control. Alternatively, even in a case where there is such a traffic light, it is also possible to execute the safe driving assistance control by estimating that the situation in which the vulnerable road user or the like cannot complete crossing the crosswalk during green traffic light is a kind of case where safe crossing is not possible. For example, an aspect of the safe driving assistance control executed in a case where there is the traffic light may be different from an aspect of the safe driving assistance control executed in a case where there is no traffic light.

Therefore, even in a case where the pedestrian is the vulnerable road user, such as an elderly person, a person with a child, and a handicapped person, or a person with no disability under the control of the vehicle control device, when the pedestrian can safely cross the cross point, the safe driving assistance control with respect to the driver such as the warning, the alerting, the deceleration, and the stop, is not unnecessarily executed, and the driver can avoid feeling annoyed. In particular, even in a case where the vulnerable road user or the like who is difficult to make a quick response cannot safely cross the cross point, the safety or relief related to the crossing the road is secured by executing the safe driving assistance control on the vehicle side. It should be noted that the information transmitted or acquired from the wearable device may be any of an aspect of being directly received from the wearable device or an aspect of being indirectly received via a third device in the vehicle control device.

Supplementary Note 2

A supplementary note 2 of the present disclosure relates to the vehicle control device according to the supplementary note 1, in which the first prediction unit is configured to detect the pedestrian who crosses the cross point based on positional information of the wearable device transmitted from the wearable device, and positional information of the vehicle.

With the vehicle control device according to the supplementary note 2, in a case where the positional information of the wearable device and the positional information of the vehicle are specified by using, for example, the GPS, it is possible to detect the pedestrian who crosses the cross point in front of the vehicle based on real-time accurate positional information.

Supplementary Note 3

A supplementary note 3 of the present disclosure relates to the vehicle control device according to the supplementary note 1, in which the estimation unit is configured to estimate whether or not the pedestrian is able to safely cross the cross point based on health management data indicating a health state of the pedestrian acquired from a health management application used by the pedestrian on the wearable device.

With the vehicle control device according to the supplementary note 3, by using, for example, the health management data managed by the health management application used in the wearable device, it is possible to pay attention to the health state of the pedestrian and estimate whether or not the pedestrian can safely cross the cross point. In a case where the health management data indicates a state in which normal walking is difficult (for example, the hearing disorder, the visual disorder, the motion disorder, or the intellectual disorder), the estimation unit may estimate whether or not the pedestrian can safely cross the cross point in accordance with the difficulty of walking by considering the information (for example, adding a margin to the predicted crossing time or crossing point in time in accordance with the severity). As described above, the estimation based on the motion ability function of each pedestrian is possible.

Supplementary Note 4

A supplementary note 4 of the present disclosure relates to the vehicle control device according to the supplementary note 3, in which the execution controller is configured to issue warning to the pedestrian by a warning method in accordance with the health state of the pedestrian as a part of the safe driving assistance control.

With the vehicle control device according to the supplementary note 4, the warning to the pedestrian is appropriately executed by the warning method in accordance with the health state of the pedestrian, such as the hearing disorder, the visual disorder, the motion disorder, or the intellectual disorder, so that the safety or relief related to the crossing of the road for the vulnerable road user or the like is secured more reliably.

Supplementary Note 5

A supplementary note 5 of the present disclosure relates to the vehicle control device according to the supplementary note 1, in which the execution controller is configured to issue warning to the pedestrian by executing a light distribution control of light generated from the vehicle as a part of the safe driving assistance control.

With the vehicle control device according to the supplementary note 5, the warning to the pedestrian is appropriately executed by the light distribution control, such as the beams of the headlights and blinking of the hazard lamps in a way that is easy to make the pedestrian recognize a danger, so that the safety or relief related to crossing of the road for the vulnerable road user or the like can be secured more reliably.

Supplementary Note 6

A supplementary note 6 of the present disclosure relates to the vehicle control device according to the supplementary note 1, in which the execution controller is configured to issue warning to a driver by executing an image control of displaying an image portion related to the pedestrian to be relatively conspicuous on an image seen from the driver in the vehicle as a part of the safe driving assistance control.

With the vehicle control device according to the supplementary note 6, the image of the front landscape of the vehicle captured by an in-vehicle front camera is displayed in a screen reflected on the monitor or the windshield such that the image portion related to the pedestrian is relatively conspicuous, so that the driver who sees the image can execute an appropriate determination and collision avoidance behavior. Therefore, the safety or relief related to crossing of the road for the vulnerable road user or the like can be secured more reliably.

The present disclosure can be appropriately changed as long as the change does not contradict the gist or idea of the disclosure that can be read from the claims and the entire specification, and a vehicle control device with such a change is also included in the technical idea of the present disclosure. The vehicle may be an automated driving vehicle.

What is claimed is:

1. A vehicle control device that controls a vehicle configured to acquire various information including information for specifying a walking speed transmitted from a wearable device attached to a pedestrian, the vehicle control device comprising a central processing unit configured to:
   predict a reaching time for the vehicle to reach a cross point in front of the vehicle or a reaching point in time when the vehicle reaches the cross point in a case where the pedestrian who crosses the cross point is detected based on the information transmitted from the wearable device;
   predict a crossing time for the pedestrian to complete crossing the cross point or a crossing point in time when the pedestrian completes crossing the cross point based on the information for specifying the walking speed acquired from the wearable device;
   estimate whether or not the pedestrian is able to safely cross the cross point by comparing the predicted reaching time with the predicted crossing time plus a margin; and
   execute a safe driving assistance control of assisting safe driving with respect to the vehicle in a case where the central processing unit estimates that the pedestrian is not able to safely cross the cross point;
   wherein when health management data acquired from a health management application used by the pedestrian on the wearable device indicates that the pedestrian's health condition is impaired making it difficult to walk, the central processing unit increases the margin for the pedestrian compared to other cases and estimates whether the pedestrian may cross the cross point safely.

2. The vehicle control device according to claim 1, wherein the central processing unit is configured to detect the pedestrian who crosses the cross point based on positional information of the wearable device transmitted from the wearable device, and positional information of the vehicle.

3. The vehicle control device according to claim 1, wherein the central processing unit is configured to estimate whether or not the pedestrian is able to safely cross the cross point based on the health management data indicating a health state of the pedestrian acquired from the health management application used by the pedestrian on the wearable device.

4. The vehicle control device according to claim 3, wherein the central processing unit is configured to issue warning to the pedestrian by a warning method in accordance with the health state of the pedestrian as a part of the safe driving assistance control.

5. The vehicle control device according to claim 1, wherein the central processing unit is configured to issue warning to the pedestrian by executing a light distribution control of light generated from the vehicle as a part of the safe driving assistance control.

6. The vehicle control device according to claim 1, wherein the central processing unit is configured to issue warning to a driver by executing an image control of displaying an image portion related to the pedestrian to be relatively conspicuous on an image seen from the driver in the vehicle as a part of the safe driving assistance control.

* * * * *